Sept. 9, 1958          J. P. HOGAN          2,851,504
SELECTIVE REMOVAL OF ACETYLENE FROM OLEFIN
AND/OR DIOLEFIN CONTAINING
HYDROCARBON STREAMS
Filed Sept. 3, 1954
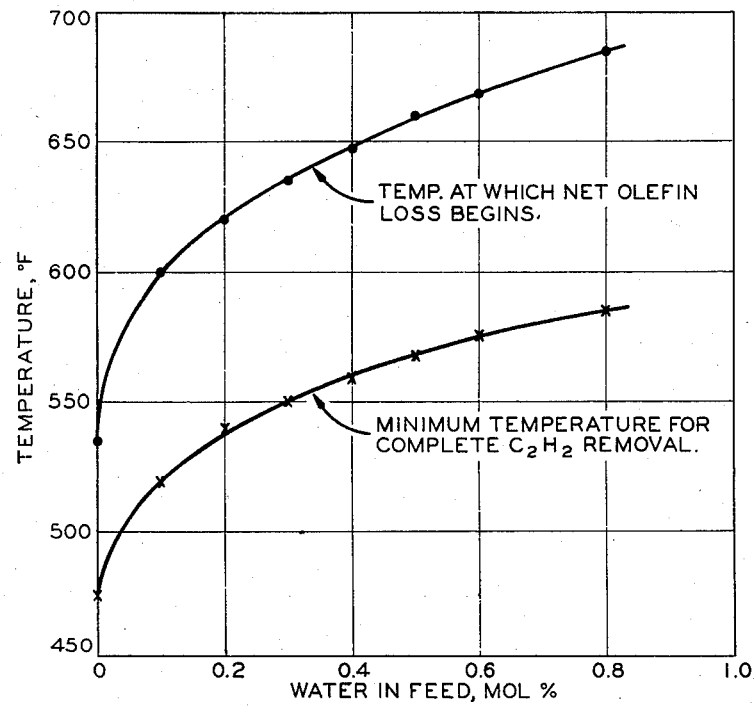
FIG. 1.     EFFECT OF WATER VAPOR IN GAS UPON
SELECTIVITY OF ACETYLENE REMOVAL.
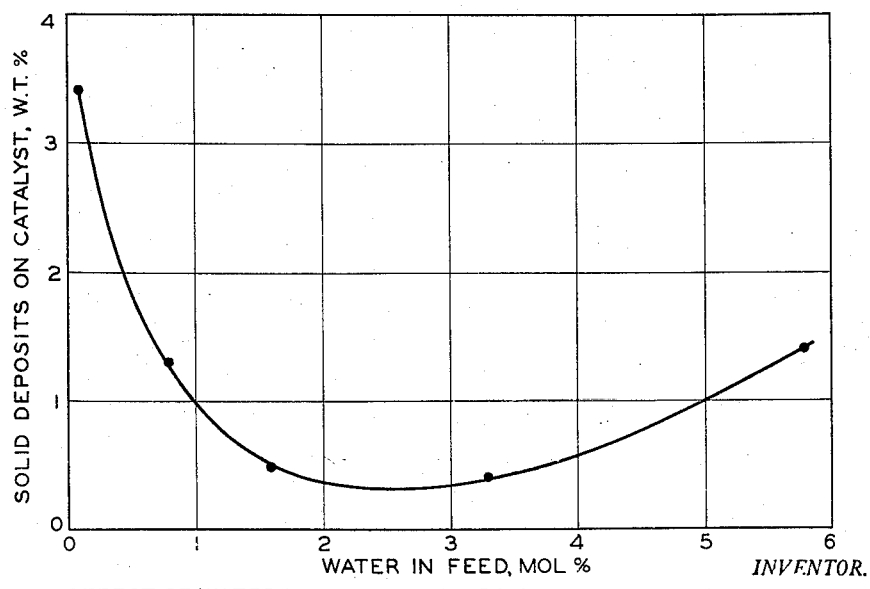
EFFECT OF WATER VAPOR IN GAS UPON
DEPOSITION OF SOLIDS ON THE CATALYST.
FIG. 2.
INVENTOR.
J. P. HOGAN
BY
ATTORNEYS 2,851,504
Patented Sept. 9, 1958

United States Patent Office 2,851,504

SELECTIVE REMOVAL OF ACETYLENE FROM OLEFIN AND/OR DIOLEFIN CONTAINING HYDROCARBON STREAMS

John Paul Hogan, Bartlesville, Okla., assignor to Phillips Petroleum Company, a corporation of Delaware Application September 3, 1954, Serial No. 454,033

23 Claims. (Cl. 260—677)

This invention relates to the selective removal of an acetylene from a hydrocarbon stream which also contains olefins and/or diolefins. In one aspect this invention relates to selectively removing an acetylene from a mixture of hydrocarbons which also contains olefins and/or diolefins by contacting said mixture with an alkalized iron oxide-chromium oxide catalyst in the presence of water vapor. In another aspect this invention relates to increasing the temperature range, between the minimum temperature for substantially complete acetylene removal and the temperature at which olefin loss begins, in a process wherein a hydrocarbon stream comprising an acetylene, a mono-olefin and/or a diolefin is contacted with a reduced alkalized iron oxide-chromium oxide catalyst in the presence of water vapor. In still another aspect this invention relates to employing an optimum amount of water vapor in said process. In still another aspect this invention relates to preventing excessive solids deposition on said catalyst in said process. Other aspects will be evident from that which follows.

One of the usual methods of manufacturing olefins comprises passing a hydrocarbon material such as ethane, propane, butane, kerosene, or other hydrocarbon-rich streams through a heating zone where such hydrocarbons are decomposed with the formation of hydrogen and one or more unsaturated compounds such as olefins and diolefins. The maximum yield of unsaturated compounds is usually obtained when the operation is performed at high reaction temperatures; however, the use of higher pyrolysis temperatures also results in the formation of acetylenic compounds which contaminate the product stream. These acetylenic materials frequently interfere with subsequent reactions in which olefinic products containing the same are to be employed and various methods for removing such materials from olefin-containing mixtures have been proposed. Although the acetylenic compounds are usually present in such hydrocarbon streams in a minor amount, often less than one mol percent, these acetylenic compounds are not readily removed without substantial loss of the more valuable olefin and diolefin constituents.

One method of removing the acetylenic hydrocarbon contaminants from the olefin and/or diolefin-rich streams is to contact the contaminated mixture with a suitable catalyst to selectively remove the acetylenic hydrocarbon contaminants without appreciable loss of the olefin and/or diolefin constituents. This process of selectively removing the acetylenic constituents from a hydrocarbon mixture containing, in addition, olefins, diolefins, and hydrogen comprises, primarily, selective hydrogenation of the acetylenic hydrocarbons to olefinic and paraffinic hydrocarbons; however, a small proportion of the acetylenic hydrocarbons are removed by polymerization to form liquid and solid polymeric material. Careful temperature control is required in carrying out the process in order to maintain selective removal of only the acetylenic hydrocarbons because the hydrogenation of olefin and diolefin hydrocarbons increases as the temperature increases. Appreciable loss of olefin and diolefin hydrocarbons can be prevented by conducting the reaction at lower temperatures with some sacrifice of acetylenic hydrocarbon removal. However, for unlimited utilization of the olefin and/or diolefin-rich streams it is necessary that the removal of acetylenic hydrocarbons be substantially complete.

Thus, there is a minimum temperature which is necessary for complete acetylene removal and a higher temperature above which substantial loss of olefin and diolefin constituents occurs. Between these two temperatures, i. e., the range of temperature between the minimum temperature for complete removal of acetylenic hydrocarbons and the temperature at which olefin loss begins, the catalyst is considered to be selective for the removal of acetylenic hydrocarbons. It is desirable that the catalyst exhibit selectivity for the removal of acetylenic hydrocarbons over a wide range of temperatures, assuring complete removal of the acetylenic hydrocarbons without substantial loss of olefin and diolefin constituents, so that careful temperature control is not required.

I have found that the range of temperature, between the minimum temperature for complete removal of acetylenic contaminants and the temperature at which net olefin loss begins, in a process for selectively removing acetylenic contaminants from an olefin and/or diolefin-rich hydrocarbon stream, wherein said hydrocarbon stream is contacted with an alkalized iron oxide-chromium oxide catalyst under reaction conditions, can be increased by injecting steam into said hydrocarbon stream. I have further found that the amount of solids deposition on said catalyst is substantially decreased when an optimum amount, discussed hereinafter, of said water vapor is employed.

Thus, according to the invention, the selectivity of a catalyst in a process for the selective removal of an acetylene from a mixture of hydrocarbons containing, in addition, other unsaturated gases and hydrogen, in which process, said mixture of hydrocarbons is contacted with an alkalized iron oxide-chromium oxide catalyst under reaction conditions, can be increased by carrying out said contacting in the presence of water vapor.

The water vapor, in the presence of which the contacting of the invention is carried out, can be included in the mixture of reactants as a result of their method of production or the said water vapor can be added from an outside source. In a presently preferred embodiment of the invention steam is employed to supply the water vapor. Said steam can be admixed with the hydrocarbons to be treated prior to treatment or while the treatment is being carried out. Thus, performing the reaction in the presence of water vapor broadens the range of temperatures between the minimum temperature for complete acetylenic hydrocarbon removal and the temperature at which olefin loss begins. The use of water vapor according to the invention also reduces the deposition of solid material on the catalyst, particularly when an optimum concentration (described hereinafter) of said water vapor in the reactant hydrocarbons is employed.

Among the acetylenic hydrocarbons which may be present in a hydrocarbon stream to be treated according to the invention, and which can be removed therefrom, are acetylene, methylacetylene, ethylacetylene, dimethylacetylene, vinylacetylene and diacetylene. The concentration of the acetylenic hydrocarbons present in the hydrocarbon stream is usually less than 1.0 mol percent; however, streams containing a higher concentration of acetylenic hydrocarbons can also be treated.

The alkalized iron oxide-chromium oxide catalyst can be prepared by mixing or grinding or promoting or impregnating iron oxide with chromium oxide and incorporating therein a suitable inorganic alkalizing agent, for example, one or more of the common alkalis, e. g., oxides, hydroxides and/or salts (e. g., carbonates) of the alkalis or even alkaline earth metals. The salt should be basic or convertible to a basic compound. Thus, a salt which is decomposable to the oxide is ordinarily employed. In the case of the alkaline earth compounds, salts hydrolyzable to the hydroxide may be used when water is added in the process of catalyst manufacture, e. g., just prior to extrusion. Herein and in the claims the various compounds of potassium or other alkali metal are alternatives of potassium hydroxide. Also, generally, the catalyst will have a composition in weight percent as follows: 0.5-50 potassium oxide, 1-40, preferably 1-30, chromium oxide and the remainder iron oxide. Preferably, the iron oxide will constitute the preponderant proportion of the catalyst. Thus, the iron oxide is the major active constituent preferably in excess of all other constituents combined with the possible exception of a carrier. Thus a now preferred catalyst will contain approximately 65-95% iron oxide. Herein and in the claims the proportions given are with reference to the composition which is to be reduced with hydrogen, as later described, prior to use as the catalyst. The iron oxide and chromium oxide can be combined by thermally decomposing a mixture of the nitrates, by coprecipitating the oxides, or by mixing the hydrous gels. One particularly suitable method is to thoroughly mix by cogrinding a mixture of powdered iron oxide and powdered chromium oxide. This mixture is then formed into a paste by the addition of a solution containing the desired amount of potassium salt, extruded or pelleted, dried, and calcined at a temperature between 700 and 1000° C. and preferably between 800 and 950° C. According to the invention the catalyst composition described is reduced with hydrogen at an elevated reducing temperature, for example, in the range 650 to about 1000° F. In a preferred embodiment of the invention the composition is subjected to the reducing conditions for a period of at least four hours. If desired the catalyst can be conditioned prior to use by treating said catalyst with an easily cokable material to deposit carbonaceous material thereon as described and claimed in co-pending application Serial No. 478,042, filed December 28, 1954.

The iron oxide can be prepared by calcining a precipitated iron oxide in the form of a powder at an elevated temperature, for example in the range 1475-1600° F., until its surface area has been reduced to below about 8 square meters per gram or until its density is equivalent to about 250 pounds per barrel. At this stage the iron oxide is of a brownish-red color and has a formula of $Fe_2O_3$. Further, calcination may be effected under reducing conditions in which event the iron oxide will be partly or completely in the form of black $Fe_3O_4$. Since the catalyst according to this invention is reduced at an elevated reducing temperature prior to use, at least some of the iron therein will be in the form of elemental iron although there may be present some incompletely reduced iron oxide.

The operating conditions employed in the process of my invention can vary over a wide range. The concentration of water vapor can be as high as about 12 mol percent; however, a concentration between about 1 and 5 mol percent is usually used and a concentration of 1.5 to 4.0 mol percent is preferred. The spread in the minimum temperature for complete acetylene removal and the temperature at which olefin loss begins increases as the concentration of water vapor in the reactant gas is increased; however, the optimum reduction in deposition of solid material on the catalyst occurs within the range of water vapor concentrations of about 1.5 to 4.0 mol percent.

The temperature employed in the process is closely related to the concentration of water vapor in the reactant gas and, in general, is above about 400° F. and below about 800° F. For example, a temperature of 550° F. is required for a water vapor concentration of 0.1 mol percent and a temperature of 680° F. is required at 5.8 mol percent water vapor in order to obtain complete acetylene removal with a gaseous hourly space velocity of 3000 and pressure of 4000 p. s. i. g. The preferred range of temperature is 610-750° F. When a substantial proportion of diolefin hydrocarbons is present in the stream being treated, the temperature can and preferably will be somewhat higher than these temperatures.

The process can be performed with a pressure in the range of 0-1000 p. s. i. g. and preferably is performed in the range of 200-600 p. s. i. g.

A space velocity in the range of 200-12,000 volumes of gas per volume of catalyst per hour can be used and preferably a gaseous hourly space velocity of 2000-6000 is employed. The space velocity also affects the temperatures at which the reaction is carried out; that is, the temperature for complete acetylene removal increases with an increase in space velocity.

The hydrogen for the hydrogenation of the acetylenic hydrocarbons is usually present in the olefin and/or diolefin-rich streams in sufficient quantity that the addition of hydrogen is not necessary; in fact, the concentration of hydrogen is usually in molecular excess of that required for hydrogenation of the acetylenic constituents to olefins. If desired or necessary, additional hydrogen can be supplied from an outside source.

The process of the invention can be carried out at conditions within the above ranges in conventional apparatus for contacting gaseous streams with solids. The following examples are illustrative of the invention.

An acetylene-contaminated hydrocarbon stream having the composition, in mol percent, shown in Table I, Table I

| | Mol percent |
|---|---|
| Hydrogen | 10 |
| Methane | 40 |
| Acetylene | 0.5 |
| Ethylene | 27 |
| Ethane | 8 |
| Propylene | 12 |
| Propane | 1 |
| $C_4+$ | 1.5 |
| | 100.0 | was contacted with a reduced alkalized iron oxide-chromium oxide catalyst containing about 10-20 percent reduced iron to determine the effect of water vapor on the selective removal of acetylene at a gaseous hourly space velocity of 3000 and a pressure of 400 p. s. i. g.

Figure I shows the increase in the spread between the minimum temperature for complete acetylene removal and the temperature at which olefin loss begins as obtained with small concentrations of water in the reactant gas.

Figure II shows the reduction in deposition of solid material on the catalyst obtained by addition of water vapor to the reactant gas. These data were obtained for runs of 24 hours' duration and were corrected for deposition during the induction period. Also, these data were obtained at temperatures ranging from 0 to 20° F. higher than the minimum temperature required for complete acetylene removal.

Herein and in the claims the term "substantially complete removal" refers to reducing the acetylene concentration to less than one part per million by weight.

Reasonable variation and modification are possible within the scope of the foregoing disclosure, the appended figures and the claims to the invention the essence of which is that the selectivity of an alkalized iron oxide-chromium oxide catalyst employed in a process for the selective removal of an acetylene from a mixture of hydrocarbons containing, in addition, other unsaturated hydrocarbons, in which process said mixture of hydrocarbons is contacted with said catalyst, under reaction conditions, can be increased by carrying out said contacting in the presence of water vapor; and further, the deposition of solid and/or liquid materials on said catalyst can be decreased, particularly when an optimum concentration of water vapor such as 1.5 to 4.0 mol percent, is employed.

I claim:

1. In a process for the selective removal of an acetylene from a mixture of gases containing, in addition to said acetylene other unsaturated gases, in which process said mixture of gases is contacted with an alkalized iron oxide-chromium oxide catalyst under hydrogenation reaction conditions in the presence of a molecular excess of hydrogen over that required to hydrogenate said acetylene, the method of increasing the selectivity of said catalyst for selective removal of said acetylene which comprises carrying out said contacting in the presence of water vapor.

2. A method according to claim 1 wherein said catalyst is reduced with hydrogen at an elevated reducing temperature within the range of about 650 to 1000° F.

3. In a process for selectively removing an acetylene from a mixture of hydrocarbons containing the same together with other unsaturated gases and hydrogen in molecular excess of that required for hydrogenation of said acetylene by contacting said mixture over a reduced alkalized iron oxide-chromium oxide catalyst under hydrogenation reaction conditions, and wherein there is a temperature range between the minimum temperature for substantially complete removal of said acetylene and the temperature at which removal of said other unsaturated gases begins, the method of increasing said temperature range which comprises carrying out said contacting in the presence of steam.

4. A process for the removal of an acetylene from a mixture of hydrocarbons containing the same which comprises contacting said mixture with a reduced alkalized iron oxide-chromium oxide catalyst under hydrogenation reaction conditions in the presence of at least sufficient hydrogen to hydrogenate said acetylene and in the presence of water vapor.

5. A process for the selective removal of an acetylene from an olefin containing hydrocarbon stream which comprises contacting said hydrocarbon stream under hydrogenation reaction conditions in the presence of at least sufficient hydrogen to hydrogenate said acetylene and in the presence of water vapor with a reduced alkalized iron oxide-chromium oxide catalyst.

6. An improved process for selectively removing acetylenic hydrocarbon contaminants from a mixture of hydrocarbons containing at least one of a substantial proportion of a mono-olefin and a substantial proportion of a diolefin together with hydrogen in molecular excess of that required to hydrogenate said acetylenic hydrocarbon contaminants which comprises contacting said mixture under hydrogenation reaction conditions and in the presence of water vapor with a reduced alkalized iron oxide-chromium oxide catalyst.

7. An improved process for selectively removing acetylenic hydrocarbon contaminants from a mixture of hydrocarbons containing mono-olefins and diolefins together with hydrogen which comprises contacting said mixture under hydrogenation reaction conditions in the presence of at least sufficient hydrogen to hydrogenate said acetylenic hydrocarbon contaminants and in the presence of water vapor with a reduced alkalized iron oxide-chromium oxide catalyst.

8. A process for the selective removal of an acetylenic hydrocarbon contaminant from at least one of an olefin-rich hydrocarbon stream which also contains hydrogen and a diolefin-rich hydrocarbon stream which also contains hydrogen, which comprises: contacting said stream in the presence of water vapor in a concentration up to 12 mol percent, and in the presence of a molecular excess of hydrogen over that required for hydrogenation of said acetylenic hydrocarbon contaminants, with a reduced alkalized iron oxide-chromium oxide catalyst at a temperature within the range of 400–800° F., a space velocity within the range of 200–12,000 volumes of gas per volume of catalyst per hour and a pressure within the range of 0–1000 p. s. i. g.

9. A process according to claim 8 wherein said hydrocarbon stream from which said acetylenic contaminant is removed is rich in both olefins and diolefins.

10. A process according to claim 8 in which iron oxide constitutes a predominant proportion of said catalyst.

11. A process according to claim 10 in which said catalyst is prepared for use in the process by reducing it in hydrogen at a temperature within the approximate range of 650–1000° F.

12. A process according to claim 8 wherein the catalyst is prepared by forming a mixture containing iron oxide and chromium oxide, incorporating therein a suitable inorganic alkalizing agent, and then reducing the mass thus obtained in an atmosphere of hydrogen at an elevated temperature.

13. A process according to claim 12 in which said alkalizing agent is one of an oxide, hydroxide and carbonate of one of an alkali and an alkaline earth metal.

14. A process according to claim 13 wherein the catalyst consists essentially of a mass of ferric oxide, chromium oxide and potassium hydroxide which has been calcined and then reduced at an elevated temperature in the presence of hydrogen.

15. A process according to claim 8 wherein said catalyst contains by weight percent 0.5–50 potassium oxide, 1–40 chromium oxide and the remainder iron oxide, said catalyst having been reduced in the presence of hydrogen at an elevated temperature prior to use, and wherein said acetylenic hydrocarbon contaminant is selectively removed at a temperature within the range of 610–750° F., a space velocity within the range of 2,000–6,000 volumes of gas per hour per volume of catalyst and a pressure of 200–600 p. s. i. g., in the presence of water vapor in a concentration within the range of 1.5–4.0 mol percent.

16. A process for the selective removal of acetylene without substantial loss of olefin from a hydrocarbon stream containing hydrogen, methane, acetylene, ethylene, ethane, propylene, propane and other hydrocarbons which comprises contacting said hydrocarbon stream in the presence of water vapor present in a concentration of water vapor up to 6 mol percent with a catalyst containing about 10–20 weight percent reduced iron at a temperature within a temperature range of 475–685° F., a space velocity of about 3000 volumes of gas per volume of catalyst per hour and a pressure of about 400 p. s. i. g., said hydrogen being present in molecular excess of that required to hydrogenate said acetylene.

17. A process according to claim 8 wherein said catalyst contains approximately 65–95 percent by weight iron oxide.

18. In a process for the selective removal of an acetylene from a mixture of gases containing, in addition to said acetylene other unsaturated gases, in which process said mixture of gases is contacted with an alkalized iron oxide-chromium oxide catalyst under hydrogenation reaction conditions in the presence of a molecular excess of hydrogen over that required to hydrogenate said acetylene, the method of increasing the selectivity of said catalyst for selective removal of said acetylene which comprises carrying out said contacting in the presence of water vapor, said catalyst being prepared by forming a mixture of iron oxide and chromium oxide, incorporating therein a suitable inorganic alkalizing agent which is one of an oxide, hydroxide and carbonate of one of an alkali and an alkaline earth metal, and reducing the mass thus obtained in an atmosphere of hydrogen at an elevated temperature.

19. In a process for selectively removing an acetylene from a mixture of hydrocarbons containing the same together with other unsaturated gases and hydrogen in molecular excess of that required for hydrogenation of said acetylene by contacting said mixture over a reduced alkalized iron oxide-chromium oxide catalyst under hydrogenation reaction conditions, and wherein there is a temperature range between the minimum temperature for substantially complete removal of said acetylene and the temperature at which removal of said other unsaturated gases begins, the method of increasing said temperature range which comprises carrying out said contacting in the presence of steam, said catalyst being prepared by forming a mixture of iron oxide and chromium oxide, incorporating therein a suitable inorganic alkalizing agent which is one of an oxide, hydroxide and carbonate of one of an alkali and an alkaline earth metal, and reducing the mass thus obtained in an atmosphere of hydrogen at an elevated temperature.

20. A process for the removal of an acetylene from a mixture of hydrocarbons containing the same which comprises contacting said mixture with a reduced alkalized iron oxide-chromium oxide catalyst under hydrogenation reaction conditions in the presence of at least sufficient hydrogen to hydrogenate said acetylene and in the presence of water vapor, said catalyst being prepared by forming a mixture of iron oxide and chromium oxide, incorporating therein a suitable inorganic alkalizing agent which is one of an oxide, hydroxide and carbonate of one of an alkali and an alkaline earth metal, and reducing the mass thus obtained in an atmosphere of hydrogen at an elevated temperature.

21. The process of claim 18 wherein said catalyst mass prior to said reduction consists essentially of from 0.5 to 50 weight percent potassium oxide, from 1 to 40 weight percent of chromium oxide, with the remainder being iron oxide.

22. The process of claim 19 wherein said catalyst mass prior to said reduction consists essentially of from 0.5 to 50 weight percent potassium oxide, from 1 to 40 weight percent of chromium oxide, with the remainder being iron oxide.

23. The process of claim 20 wherein said catalyst mass prior to said reduction consists essentially of from 0.5 to 50 weight percent potassium oxide, from 1 to 40 weight percent of chromium oxide, with the remainder being iron oxide.

References Cited in the file of this patent

UNITED STATES PATENTS

| | | |
|---|---|---|
| 1,836,927 | Linckh et al. | Dec. 15, 1931 |
| 1,842,010 | Braus | Jan. 19, 1932 |
| 2,359,759 | Hebbard et al. | Oct. 10, 1944 |
| 2,564,278 | Ray | Aug. 14, 1951 |
| 2,735,879 | Redcay | Feb. 21, 1956 |

FOREIGN PATENTS

| | | |
|---|---|---|
| 288,216 | Great Britain | Jan. 31, 1929 |
| 646,408 | Great Britain | Nov. 22, 1950 |